United States Patent
Shaheen (10) Patent No.: US 9,826,443 B2
(45) Date of Patent: *Nov. 21, 2017

(54) METHOD AND APPARATUS FOR SUPPORTING HANDOVER FROM LTE/EUTRAN TO GPRS/GERAN

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,277

(22) Filed: Dec. 5, 2011

(65) Prior Publication Data

US 2012/0077500 A1   Mar. 29, 2012

Related U.S. Application Data

(63) Continuation of application No. 12/029,532, filed on Feb. 12, 2008, now Pat. No. 8,072,936.

(Continued)

(51) Int. Cl.
*H04W 4/00* (2009.01)
*H04W 36/00* (2009.01)
(Continued)

(52) U.S. Cl.
CPC .... *H04W 36/0061* (2013.01); *H04W 36/0011* (2013.01); *H04W 36/0022* (2013.01); *H04W 36/12* (2013.01); *H04W 36/14* (2013.01)

(58) Field of Classification Search
None
See application file for complete search history.

(56) References Cited

U.S. PATENT DOCUMENTS 6,308,267 B1 * 10/2001 Gremmelmaier ....... H04W 8/06
370/329
6,845,238 B1    1/2005 Muller
(Continued)

FOREIGN PATENT DOCUMENTS

CN         1354963      6/2002
JP       2001-197539    7/2001
(Continued)

OTHER PUBLICATIONS

Third Generation Partnership Project, "Technical Specification Group Services and System Aspects; General Packet Radio Service (GPRS); Service description; Stage 2 (Release 7)," 3GPP TS 23.060 V7.3.0 (Dec. 2006).

(Continued)

*Primary Examiner* — Alpus H Hsu
(74) *Attorney, Agent, or Firm* — Quasim A. Shah (57) ABSTRACT

A method for use in a source long term evolution (LTE) mobility management entity (MME) and an MME are disclosed. The method includes receiving a relocation request from an evolved Node B (eNB), determining a handover target global system for mobile (GSM)/enhanced data rates for GSM evolution (EDGE) radio access network (GERAN) system for a handover of a wireless transmit/receive unit (WTRU) based on the received relocation request, identifying a serving General Packet Radio Service (GPRS) support node (SGSN) that controls a target GERAN cell, and forwarding the relocation request to a target SGSN.

7 Claims, 11 Drawing Sheets

Related U.S. Application Data (60) Provisional application No. 60/889,383, filed on Feb. 12, 2007.

(51) Int. Cl.
*H04L 12/28* (2006.01)
*H04W 36/14* (2009.01)
*H04W 36/12* (2009.01)

(56) References Cited

U.S. PATENT DOCUMENTS

| | | | |
|---|---|---|---|
| 6,901,257 B2 | 5/2005 | Kubota | |
| 7,003,297 B2 | 2/2006 | Willars et al. | |
| 7,466,652 B2* | 12/2008 | Lau | H04L 41/0866 370/230.1 |
| 7,778,641 B1 | 8/2010 | Willars et al. | |
| 7,809,373 B2 | 10/2010 | Park et al. | |
| 8,023,467 B2 | 9/2011 | Wu et al. | |
| 8,032,133 B2* | 10/2011 | Niemela | H04W 48/18 370/328 |
| 8,072,936 B2 | 12/2011 | Shaheen | |
| 8,644,247 B2* | 2/2014 | Madour et al. | 370/331 |
| 8,817,758 B2* | 8/2014 | Fox | H04W 84/042 370/336 |
| 2004/0266438 A1 | 12/2004 | Bjelland et al. | |
| 2005/0130659 A1* | 6/2005 | Grech | H04L 63/08 455/436 |
| 2005/0249188 A1 | 11/2005 | Hayashi | |
| 2006/0276190 A1 | 12/2006 | Shaheen | |
| 2007/0019575 A1 | 1/2007 | Shaheen | |
| 2007/0019643 A1 | 1/2007 | Shaheen | |
| 2007/0021120 A1 | 1/2007 | Flore et al. | |
| 2007/0213060 A1* | 9/2007 | Shaheen | 455/436 |
| 2007/0248064 A1 | 10/2007 | Shaheen | |
| 2008/0013553 A1 | 1/2008 | Shaheen | |
| 2008/0098467 A1* | 4/2008 | Miller et al. | 726/5 |
| 2008/0102896 A1 | 5/2008 | Wang et al. | |
| 2008/0130578 A1 | 6/2008 | Wang et al. | |
| 2008/0181178 A1 | 7/2008 | Shaheen | |
| 2009/0073933 A1* | 3/2009 | Madour et al. | 370/331 |
| 2010/0061340 A1* | 3/2010 | Ramle | H04W 36/12 370/331 |
| 2011/0122839 A1* | 5/2011 | Rexhepi | H04W 36/12 370/331 |

FOREIGN PATENT DOCUMENTS

| | | |
|---|---|---|
| JP | 2002-541747 | 12/2002 |
| JP | 2003-509982 | 3/2003 |
| KR | 2001-0108453 | 12/2001 |
| WO | 98/06226 | 2/1998 |
| WO | 0038465 A1 | 6/2000 |
| WO | 00/60895 | 10/2000 |
| WO | 01/67788 | 9/2001 |
| WO | 2005/060296 | 6/2005 |
| WO | WO 2005/089249 | 9/2005 |
| WO | 2005/096560 | 10/2005 |
| WO | WO 2006/112561 | 10/2006 |
| WO | 2006125085 A2 | 11/2006 |
| WO | 2006/130058 | 12/2006 |
| WO | 2007/007990 | 1/2007 |
| WO | 2007007990 A1 | 1/2007 |
| WO | WO 2007/011983 | 1/2007 |

OTHER PUBLICATIONS

Third Generation Partnership Project, "Technical Specification Group Services and System Aspects; General Packet Radio Service (GPRS); Service description; Stage 2 (Release 7)," 3GPP TS 23.060 V7.6.0 (Dec. 2007).
Third Generation Partnership Project, "Technical Specification Group Core Network and Terminals; Customised Applications for Mobile network Enhanced Logic (CAMEL) Phase 4; Stage 2 (Release 7)," 3GPP TS 23.078 V7.6.0 (Dec. 2006).
Third Generation Partnership Project, "Technical Specification Group Core Network and Terminals; Customised Applications for Mobile network Enhanced Logic (CAMEL) Phase 4; Stage 2 (Release 7)," 3GPP TS 23.078 V7.9.0 (Sep. 2007).
Third Generation Partnership Project, "Technical Specification Group Services and System Aspects; Intra-domain connection of Radio Access Network (RAN) nodes to multiple Core Network (CN) nodes (Release 7)," 3GPP TS 23.236 V7.0.0 (Dec. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN) Radio interface protocol aspects (Release 7)," 3GPP TR 25.813 V7.1.0 (Sep. 2006).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.0.0 (Dec. 2007).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.0.0 (Dec. 2007).
Third Generation Partnership Project, "Technical Specification Group Radio Access Network; Physical layer—Measurements (Release 8)," 3GPP TS 36.214 V0.1.0 (Oct. 2006).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.0.0 (Dec. 2007).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007).
Third Generation Partnership Project, "Technical Specification Group Services and System Aspects; 3GPP System Architecture Evolution: GPRS enhancements for LTE access; Release 8," 3GPP TS 23.401 V0.1.0 (Jan. 2007).
Third Generation Partnership Project, "Technical Specification Group Radio Access Network; Evolved Universal Terrestrial Radio Access (E-UTRA); Physical layer—Measurements (Release 8)," 3GPP TS 36.214 V8.1.0 (Nov. 2007).
Third Generation Partnership Project, "Technical Specification Group GERAN; Packet-switched handover for GERAN A/Gb mode; Stage 2 (Release 6)," 3GPP TS 43.129 V6.10.0 (Nov. 2006).
Third Generation Partnership Project, "Technical Specification Group GERAN; Packet-switched handover for GERAN A/Gb mode; Stage 2 (Release 6)," 3GPP TS 43.129 V6.12.0 (May 2007).
Third Generation Partnership Project, "Technical Specification Group GSM/EDGE Radio Access Network;Packet-switched handover for GERAN A/Gb mode; Stage 2 (Release 7)," 3GPP TS 43.129 V7.0.0 (Nov. 2006).
Third Generation Partnership Project, Technical Specification Group GSM/EDGE Radio Access Network; Packet-switched handover for GERAN A/Gb mode; Stage 2 (Release 7)3GPP TS 43.129 V7.2.0 (May 2007).
Third Generation Partnership Project, "Technical Specification Group Radio Access Network; Evolved Universal Terrestrial Radio Access (E-UTRA) and Evolved Universal Terrestrial Radio Access Network (E-UTRAN) Radio interface protocol aspects (Release 7)," 3GPP TR 25.813 V7.0.0 (Jun. 2006).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.17.0 (Mar. 2005).

(56) References Cited

OTHER PUBLICATIONS

Third Generation Partnership Project, "Technical Specification Group Radio Access Network; Radio Resource Control (RRC); Protocol Specification (Release 4)," 3GPP TS 25.331 V4.18.0 (Dec. 2007).
Third Generation Partnership Project, "Technical Specification Group Radio Access Network; Radio Resource Control (RRC); Protocol Specification (Release 5)," 3GPP TS 25.331 V5.19.0 (Dec. 2006).
Third Generation Partnership Project, "Technical Specification Group Radio Access Network; Radio Resource Control (RRC); Protocol Specification (Release 5)," 3GPP TS 25.331 V5.21.0 (Dec. 2007).
Third Generation Partnership Project, "Technical Specification Group Radio Access Network; Radio Resource Control (RRC); Protocol Specification (Release 6)," 3GPP TS 25.331 V6.12.0 (Dec. 2006).
Third Generation Partnership Project, "Technical Specification Group Radio Access Network; Radio Resource Control (RRC); Protocol Specification (Release 6)," 3GPP TS 25.331 V6.16.0 (Dec. 2007).
Third Generation Partnership Project, "Technical Specification Group Radio Access Network; Radio Resource Control (RRC); Protocol Specification (Release 7)," 3GPP TS 25.331 V7.3.0 (Dec. 2006).
Third Generation Partnership Project, "Technical Specification Group Radio Access Network; Radio Resource Control (RRC); Protocol Specification (Release 7)," 3GPP TS 25.331 V7.7.0 (Dec. 2007).
Third Generation Partnership Project, "Technical Specification Group Radio Access Network; Radio Resource Control (RRC); Protocol Specification (Release 8)," 3GPP TS 25.331 V8.1.0 (Dec. 2007).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Core Network; Customised Applications for Mobile network Enhanced Logic (CAMEL) Phase 3—Stage 2 (Release 1999)," 3GPP TS 23.078 V3.19.0 (Mar. 2004).
Third Generation Partnership Project, "Technical Specification Group Core Network; Customised Applications for Mobile network Enhanced Logic (CAMEL) Phase 3—Stage 2 (Release 4)," 3GPP TS 23.078 V4.11.1 (Apr. 2004).
Third Generation Partnership Project, "Technical Specification Group Core Network and Terminals; Customised Applications for Mobile network Enhanced Logic (CAMEL) Phase 4; Stage 2 (Release 5)," 3GPP TS 23.078 V5.11.0 (Jun. 2006).
Third Generation Partnership Project, "Technical Specification Group Core Network; Customised Applications for Mobile network Enhanced Logic (CAMEL) Phase 4; Stage 2 (Release 6)," 3GPP TS 23.078 V6.9.0 (Dec. 2006).
Third Generation Partnership Project, "Technical Specification Group Services and System Aspects; Intra-domain connection of Radio Access Network (RAN) nodes to multiple Core Network (CN) nodes (Release 5)," 3GPP TS 23.236 V5.4.0 (Sep. 2005).
Third Generation Partnership Project, "Technical Specification Group Services and System Aspects; Intra-domain connection of Radio Access Network (RAN) nodes to multiple Core Network (CN) nodes (Release 6)," 3GPP TS 23.236 V6.3.0 (Mar. 2006).
Nokia, "LTE Mobility Signalling," 3GPP TSG-RAN WG2 Meeting #53, R2-061137 (May 8-12, 2006).
Nokia, "I-RAT HO principles from E-UTRAN point of view," 3GPP TSG SA WG2, S2-070338, Florence, Italy (Jan. 15-19, 2007).
Third Generation Partnership Project, "Technical Specification Group Services and System Aspects; 3GPP System Architecture Evolution: Report on Technical Options and Conclusions (Release 7)," 3GPP TR 23.882 V1.6.1 (Nov. 2006).
Third Generation Partnership Project, "Technical Specification Group Services and System Aspects; 3GPP System Architecture Evolution: Report on Technical Options and Conclusions (Release 7)," 3GPP TR 23.882 V1.14.0 (Jan. 2008).
ZTE Corporation, "Active mobility solution for SAE accessed from UMTS ," 3GPP TSG SA WG2 Architecture—S2#52, S2-061496, Shanghai, China (May 8-12, 2006).
"Chinese Office Action", Chinese Application No. 200820004751. 3, dated Nov. 30, 2011, 5 pages.
"Chinese Office Action (English Translation)", Chinese Application No. 200880004751.3, dated Nov. 30, 2011, 8 pages.
"Japanese Notice of Rejection", Japanese Application No. 2014-100722, dated Feb. 17, 2015, 3 pages.
"Japanese Notice of Rejection", Japanese Application No. 2012-113519, dated Sep. 3, 2013, 4 pages.
"Japanese Notice of Rejection (English Translation)", Japanese Application No. 2012-113519, dated Feb. 17, 2015, 3 pages.
"Japanese Notice of Rejection (English Translation)", Japanese Application No. 2014-100722, dated Feb. 17, 2015, 3 pages.
"Korean Office Action", Korean Application No. 10-2009-7018868, dated Mar. 2, 2011, 3 pages.
"Korean Office Action (English Translation)", Korean Application No. 10-2009-7018868, dated Mar. 2, 2011, 6 pages.
Nokia, "LTE Mobility Signalling", 3GPP Tdoc R2-061137, 3GPP TSG-RAN WG2 Meeting #53, Shanghai, China, May 8-12, 2006, 5 pages.
"Korean Office Action", Korean Application No. 10-2014-7025776, dated Jul. 28, 2015, 3 pages.
"Korean Office Action (English Translation)", Korean Application No. 10-2014-7025776, dated Jul. 28, 2015, 4 pages.
"First Examination Report", Indian Application No. 5212/DELNP/2009, dated Sep. 10, 2015, 2 pages.
"Official Notice of Rejection", Japanese Application No. 2012-113519, dated Apr. 26, 2016, 22 pages.
"Official Notice of Rejection (English Translation)", Japanese Application No. 2012-113519, dated Apr. 26, 2016, 24 pages.
Huawei, "Inter RAT handover procedures between 3GPP access systems", 3GPP Tdoc S2-070078, 3GPP TSG SA WG2 Architecture—S2#56, Florence, Italy, Jan. 15-19, 2007, 12 pages.
Nokia, "MME/UPE Relocation in Inter-PLMN Handover", 3GPP Tdoc S2-070339, 3GPP TSG-SA WG2 Meeting #56, Florence, Italy, Jan. 15-19, 2007, 4 Pages.
Siemens, Nokia, "51 Handover functions and procedures", 3GPP Tdoc R3-070284, TSG RAN WG3 Meeting #55, St. Louis, Missouri, USA, Feb. 12-16, 2007, 6 pages.
"Changes to enable the GSMA root DNS architecture", 3GPP Tdoc N4-030876 Change Request, 3GPP TSG CN WG4 Meeting #20 Sophia Antipolis, France, Aug. 25-29, 2003, 7 pages.
"Official Notice of Rejection", Japanese Patent Application No. 2014-100722, dated Nov. 15, 2016, 17 pages.
"Official Notice of Rejection (English Translation)", Japanese Patent Application No. 2014- 100722, dated Nov. 15, 2016, 14 pages.
"Official Notice of Rejection", Japanese Patent Application No. 2016-166095, Jan. 6, 2017, 3 pages.
"Official Notice of Rejection (English Translation)", Japanese Patent Application No. 2016-166095, Jun. 6, 2017, 4 pages.
"Options for user plane handling in LTE-GERAN handovers", 3GPP Workshop LTE GSM, LGW-070027 Sophia Antipolis, Jan. 10-11, 2007, 8 pages.

(56) References Cited

OTHER PUBLICATIONS

"Options for user plane handling in LTE-GERAN handovers", 3GPP Workshop LTE GSM, LGW-070024, Sophia Antipolis, Jan. 10-11, 2007, 8 pages.

Nortel, "New Attach procedure with agreement on S5a", 3GPP Tdoc S2-070356, 3GPP TSG SA WG2 Architecture—S2#56, Jan. 15-19, 2007, 5 pages.

* cited by examiner

METHOD AND APPARATUS FOR SUPPORTING HANDOVER FROM LTE/EUTRAN TO GPRS/GERAN

CROSS REFERENCE TO RELATED APPLICATIONS

This application is a continuation of U.S. patent application Ser. No. 12/029,532 filed Feb. 12, 2008, which issues as U.S. Pat. No. 8,072,936 on Dec. 6, 2011, which claims the benefit of U.S. Provisional Application No. 60/889,383, filed Feb. 12, 2007, the contents of which are hereby incorporated by reference herein.

FIELD OF INVENTION

This application is related to wireless communications.

BACKGROUND

There are different types of wireless communication systems. For example, some wireless communication systems include general packet radio service (GPRS), global system for mobile (GSM)/enhanced data rates for GSM evolution (EDGE) radio access network (GERAN), and the newly introduced long term evolution (LTE) evolved universal terrestrial radio access network (EUTRAN). LTE/EUTRAN system has a different physical layer and a different architecture from those systems preceding it, i.e., GPRS, GERAN, or UTRAN.

When a Multi-mode mobile unit is traveling across the geographic coverage of these different systems, it may need to be handed off from one network to another. Since not all networks are identical, a method for supporting the handover between systems would be beneficial.

Figure 1:
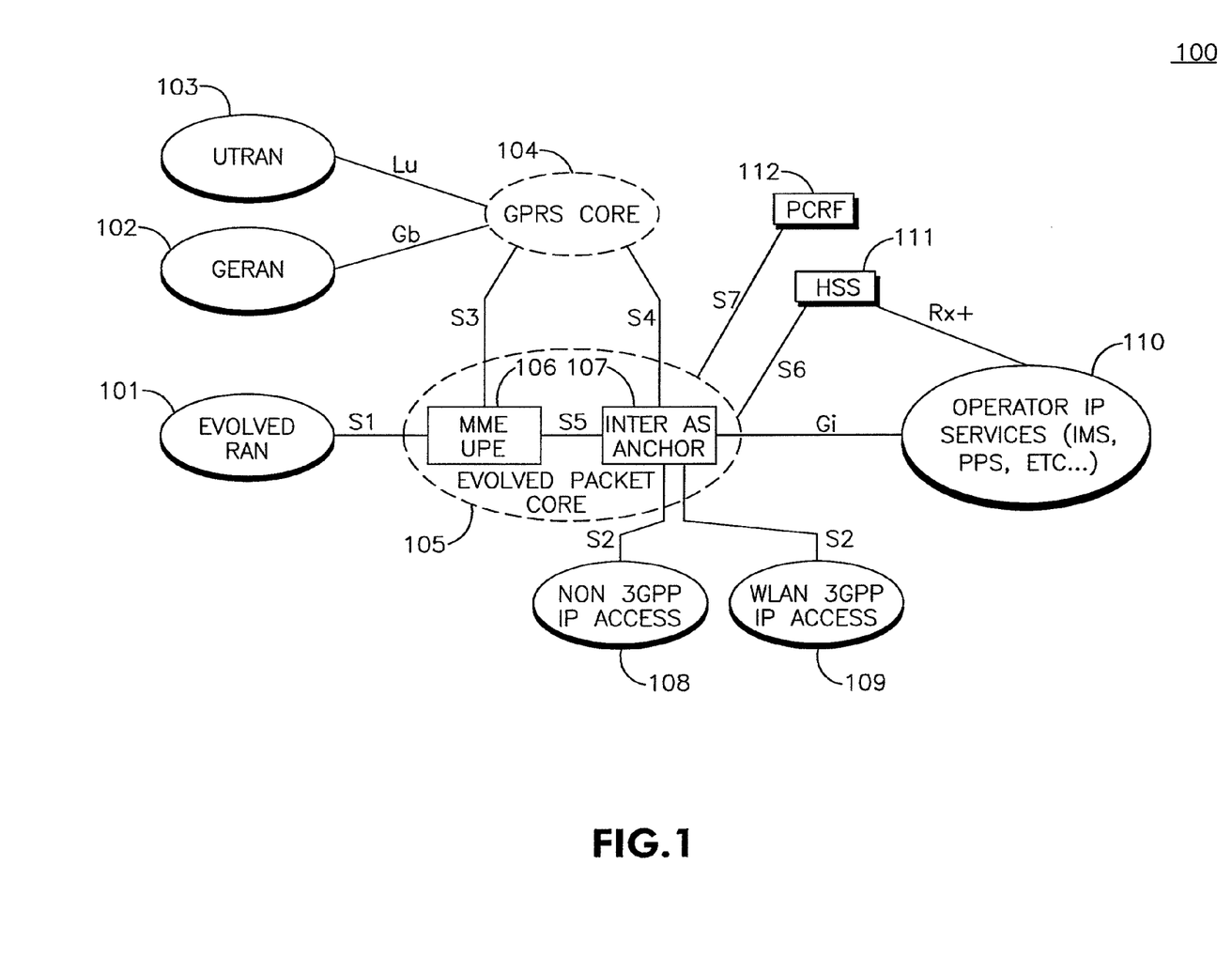
FIG. 1 shows an example of an LTE general network architecture.

FIG. 1 shows an exemplary diagram of a system 100 including an LTE system architecture. The system 100 shows an LTE/EUTRAN 101 and its evolved packet core 105 interworking with an existing GERAN 102, UTRAN 103, and their GPRS Core 104. The LTE/EUTRAN 101 comprises an E-Node B (not shown) that is connected (S1) to an evolved packet core 105 containing a mobility management entity/user plane entity (MME/UPE) 106 and an inter AS anchor Gateway 107. The Evolved Packet Core 105 connects (S6) to a home subscriber service (HSS) 111, and connects (S7) to a Policy and Charging Rules (PCRF) 112. The inter AS Anchor gateway 107 connects (Gi) to Operator IP Servers (such as IMS, PSS) 110, connects (S2) to a Non-3GPP IP Access network 108, and connects (S2) to a WLAN 3GPP IP Access network 109. The GPRS Core 104 comprises a Serving GPRS Support Node (SGSN) (not shown) which is responsible for Mobility Management, Access Procedures, and User Plane Control. The GPRS Core 104 also comprises a Gateway GPRS Support Node (GGSN), where the network is connected to external networks and other operator servers. The Operator IP Servers 110 may include an IP Multimedia Service Subsystem (IMS) where VoIP and other multimedia services are controlled. The Non-3GPP IP access network 108 includes connections to other technologies that are developed in other standard Forums such as 3GPP2 (CDMA2000) and WiMAX (IEEE 802.16 system). The WLAN 3GPP IP access network 109 has WLANs incorporated into 3GPP systems via interworking architecture defined in 3GPP.

SUMMARY

A method and apparatus for supporting handover from an LTE/EUTRAN cell to a general packet radio service (GPRS)/global system for mobile communications (GSM)/enhanced data rates for GSM evolution (EDGE) radio access network (GERAN) cell. In one embodiment, a GERAN access procedure during the handover includes sending a packet switched (PS) attach signal. In another embodiment, the GERAN access procedure includes RAN mobility information messages being exchanged between the WTRU and a target base station controller (T-BSC).

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 2:
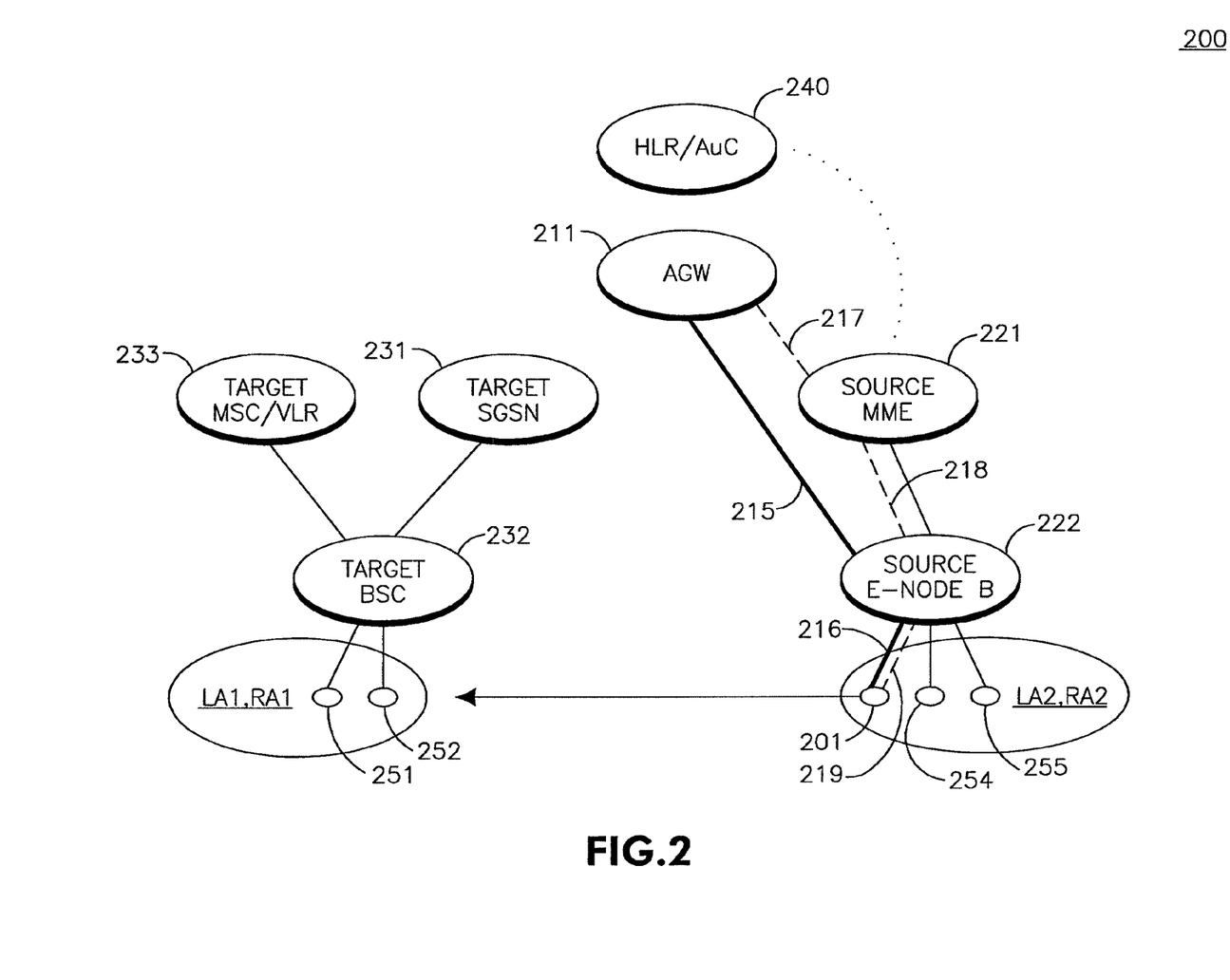
FIG. 2 shows an initial state for handoff from an LTE system to a GPRS/GERAN system.
Figure 3:
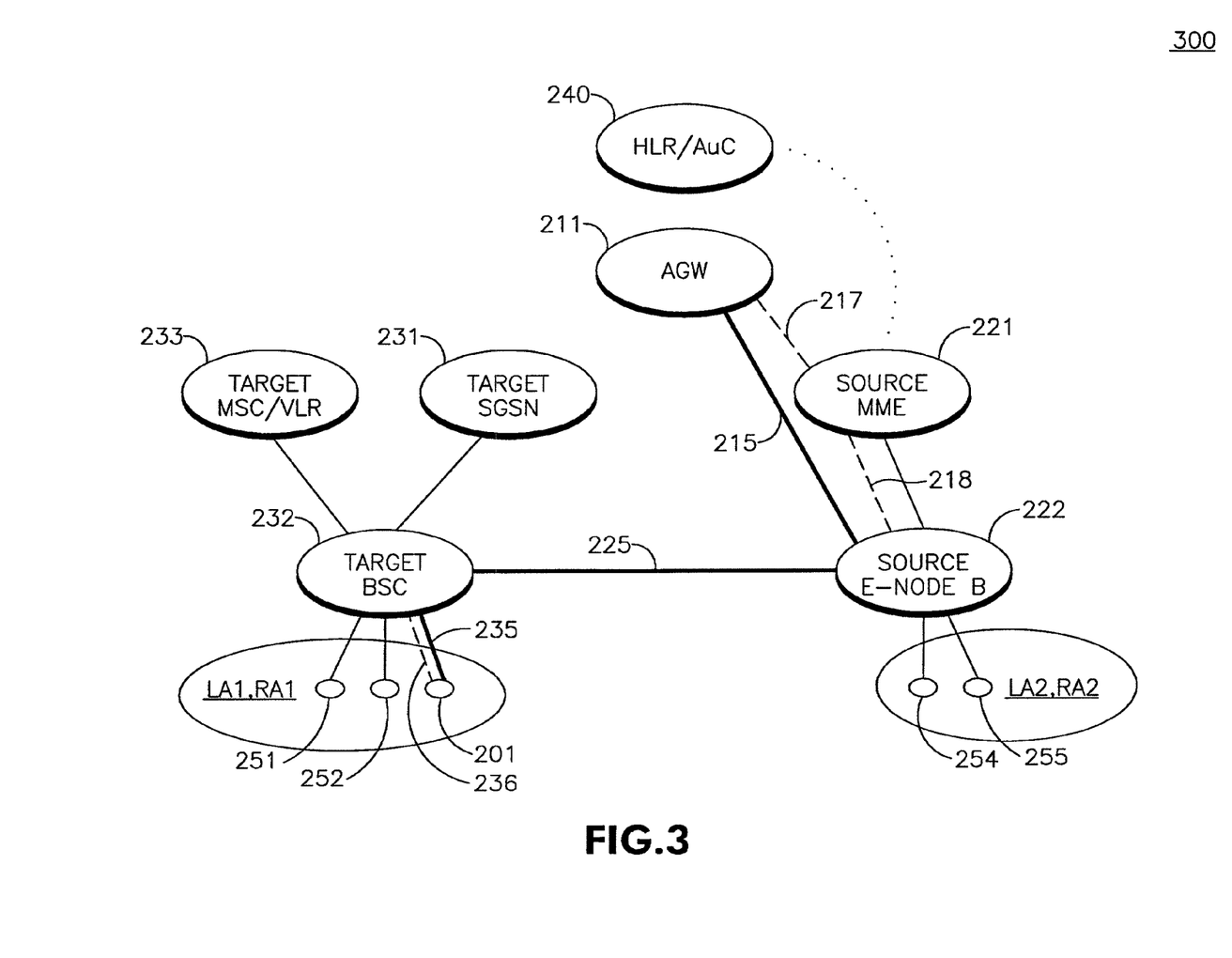
FIG. 3 shows a second state for handoff from an LTE system to a GPRS/GERAN system.
Figure 4:
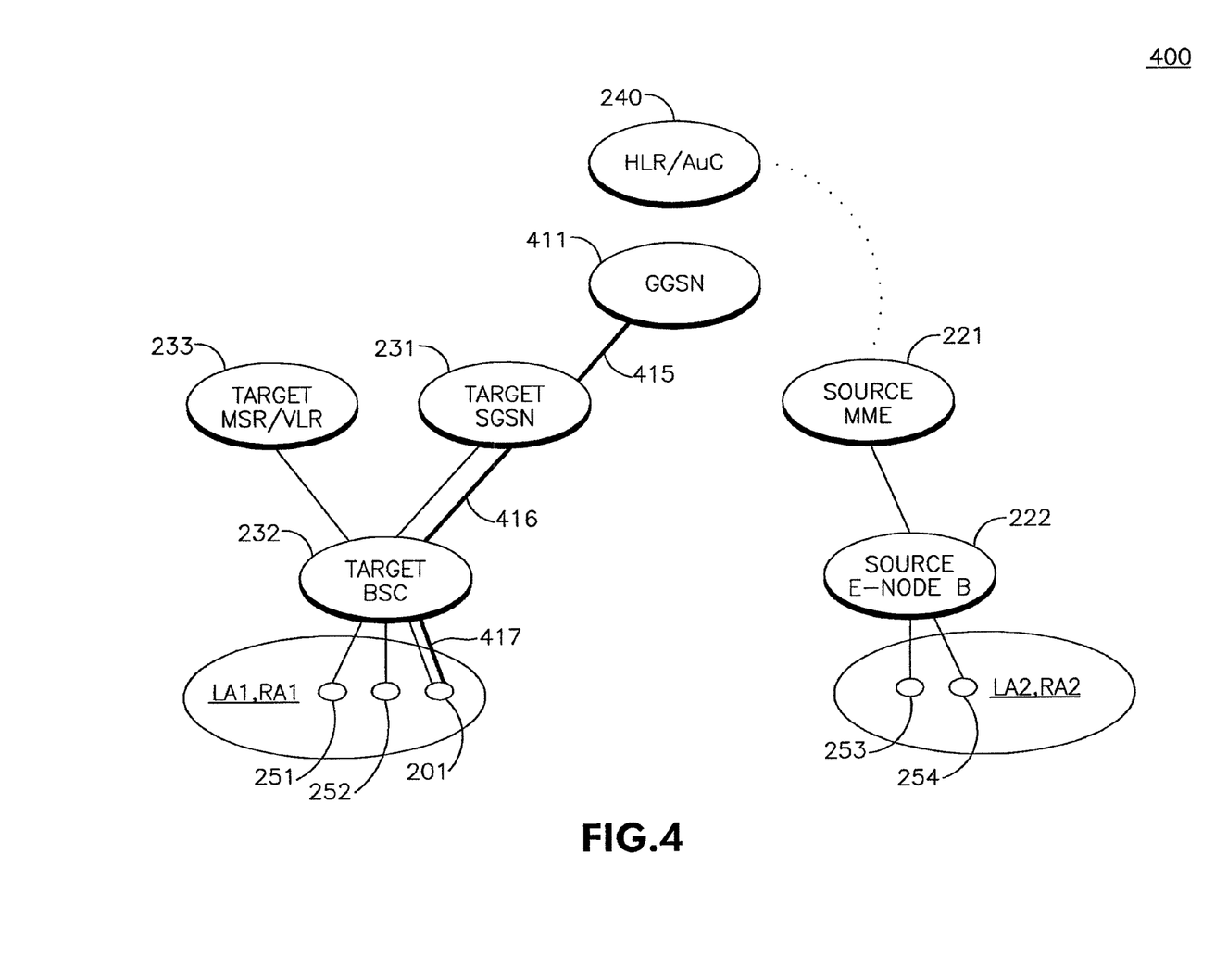
FIG. 4 shows a third state for handoff from an LTE system to a GPRS/GERAN system.

FIGS. 2-4 show examples of three states of traffic paths and tunnels established between network entities during a handover of a WTRU from an LTE network to a GERAN network. In FIG. 2, an initial state 200 is shown for a mobile WTRU 201 moving from an LTE network cell designated as local area LA2/Routing Area RA2, to a GERAN system LA1/RA1. The cells belonging to GERAN systems may constitute different Location Area/Routing Area (LA1/RA1) from those belonging to LTE based cells (LA2/RA2). In certain deployments, although GERAN cells may be co-located with GERAN cells, these cells will remain under different LA/RA configuration due to the difference between the two system architectures. Other WTRUs 254, 255 are shown camped on the cell LA2/RA2, and WTRUs 251, 252 are camped on the cell LA1/RA1. The WTRU is currently connected to an access gateway 211 via a source Evolved Node B (ENB) 222, where tunnels 215 and 216 are established for the user data plane. Source mobility management entity (MME) 221 controls mobility and handles user control plane traffic on tunnels 217 and 218. User control plane traffic is connected on tunnel 219 between the source ENB 222 and the WTRU 201. The target GERAN system comprises a target SGSN 231, a target base station controller (BSC) 232, and a target mobile services switching center/visitor location register (MSC/VLR) entity 233.

FIG. 3 shows an optional second state 300 for tunneling of network entities during the handover of the WTRU 201 from the LTE network cell LA2/RA2 to the GERAN cell LA1/RA1. The WTRU 201 is now migrated to the GERAN cell LA1/RA1.

An optional tunnel 225 may be created between the target BSC 232 of the GERAN system and the source ENB 222. The tunnel 225 may be used to temporarily forward the current pending data transfer between GERAN system and the WTRU via E-Node B while a new connection between the Evolved Core Network 105 and the GPRS Core 104 (i.e., while the backbone procedures to switch traffic is completed). This will ensure that no data is lost during transition. A system operator may choose not to implement this step and go to a complete transition case where no connection is established between the GERAN BSC 232 and ENB 222. In such a case, forwarding of data occurs at higher layers, between the two core networks on S3 and S4 connections. The user data plane and control plane traffic is carried to the WTRU 201 across the tunnels 235 and 236, respectively.

FIG. 4 state 400 for tunneling of network entities during the handover of the WTRU 201 from the LTE network cell LA2/RA2 to the GERAN cell LA1/RA1. As shown in FIG. 4, the traffic switching has occurred in the upper layers such that the GERAN system is now is the network source for user traffic, as shown by GGSN 411. The WTRU 201 is now connected to the GERAN system GGSN 411 via the Target SGSN 231, and the target BSC 232, on user data plane and control plane tunnels 415, 416 and 417, respectively.

Figure 5:
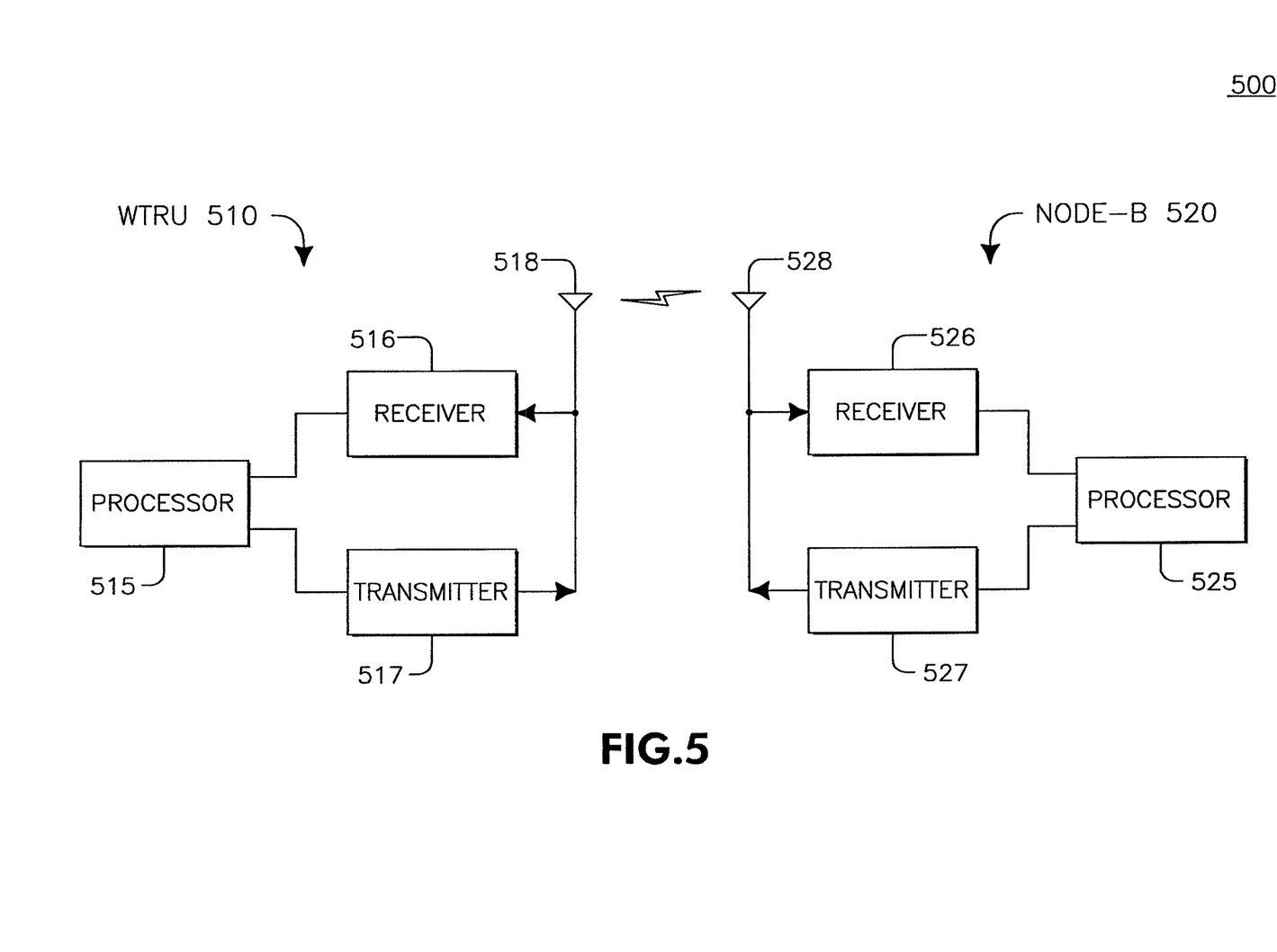
FIG. 5 shows a functional block diagram of a wireless transmit/receive unit and a Node B.

FIG. 5 is a functional block diagram of a WTRU 510 and a Node B 520. As shown in FIG. 5, the WTRU 510 is in communication with the Node B 520 and both are configured to support handover from GPRS/GERAN to LTE/EUTRAN.

In addition to the components that may be found in a typical WTRU, the WTRU 510 includes a processor 515, a receiver 516, a transmitter 517, and an antenna 518. The processor 515 is configured to support handover from GPRS/GERAN to LTE/EUTRAN. The receiver 516 and the transmitter 517 are in communication with the processor 515. The antenna 518 is in communication with both the receiver 516 and the transmitter 517 to facilitate the transmission and reception of wireless data. The processor 515, receiver 516, transmitter 517, and antenna 518 may be configured as a GPRS/GERAN radio transceiver, or configured as an LTE/EUTRAN radio transceiver. Also, although only one processor, receiver, transmitter, and antenna is shown, it should be noted that multiple processors, receivers, transmitters, and antennas may be included in the WTRU 510, whereby different groupings of processors, receivers, transmitters, and antennas operate in different modes, (e.g., GPRS/GERAN transceiver or LTE/EUTRAN transceiver).

In addition to the components that may be found in a typical Node B, the Node B 520 includes a processor 525, a receiver 526, a transmitter 527, and an antenna 528. The processor 525 is configured to support handover from LTE/EUTRAN to GERAN. The receiver 526 and the transmitter 527 are in communication with the processor 525. The antenna 528 is in communication with both the receiver 526 and the transmitter 527 to facilitate the transmission and reception of wireless data.

Figure 6A:
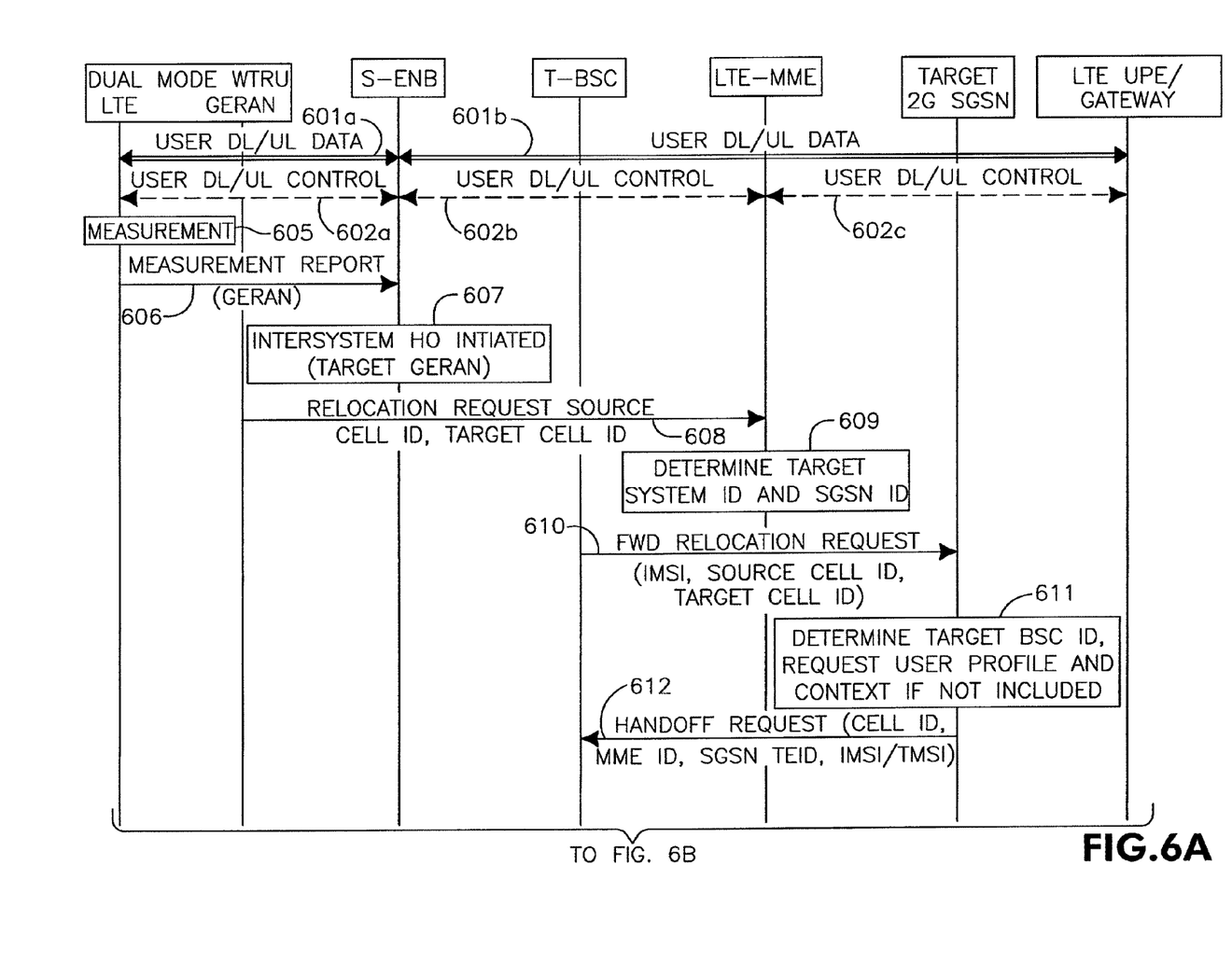
FIGS. 6A, 6B, 6C show a signal flow diagram of a handover procedure including a packet switched (PS) handover signal.
Figure 6B:
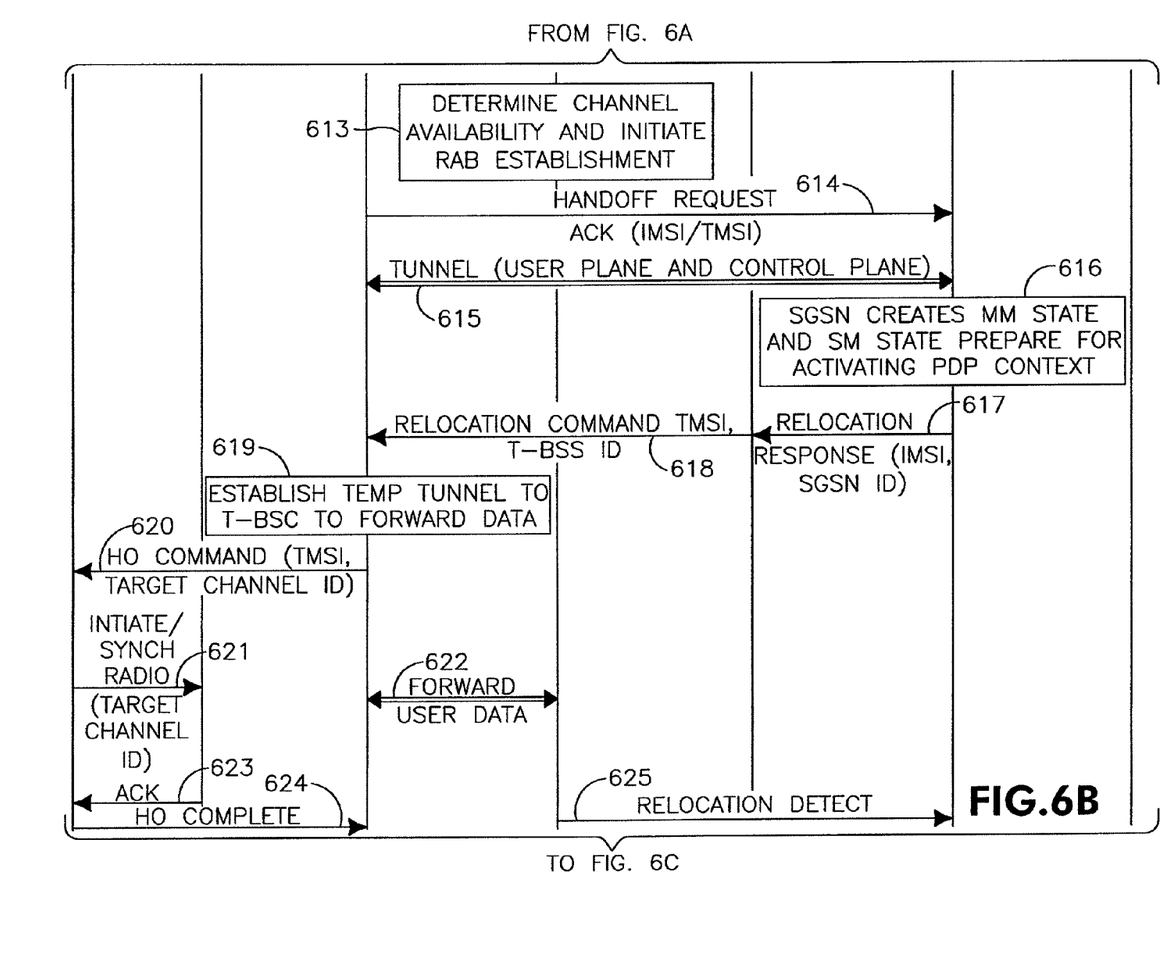
Figure 6C:
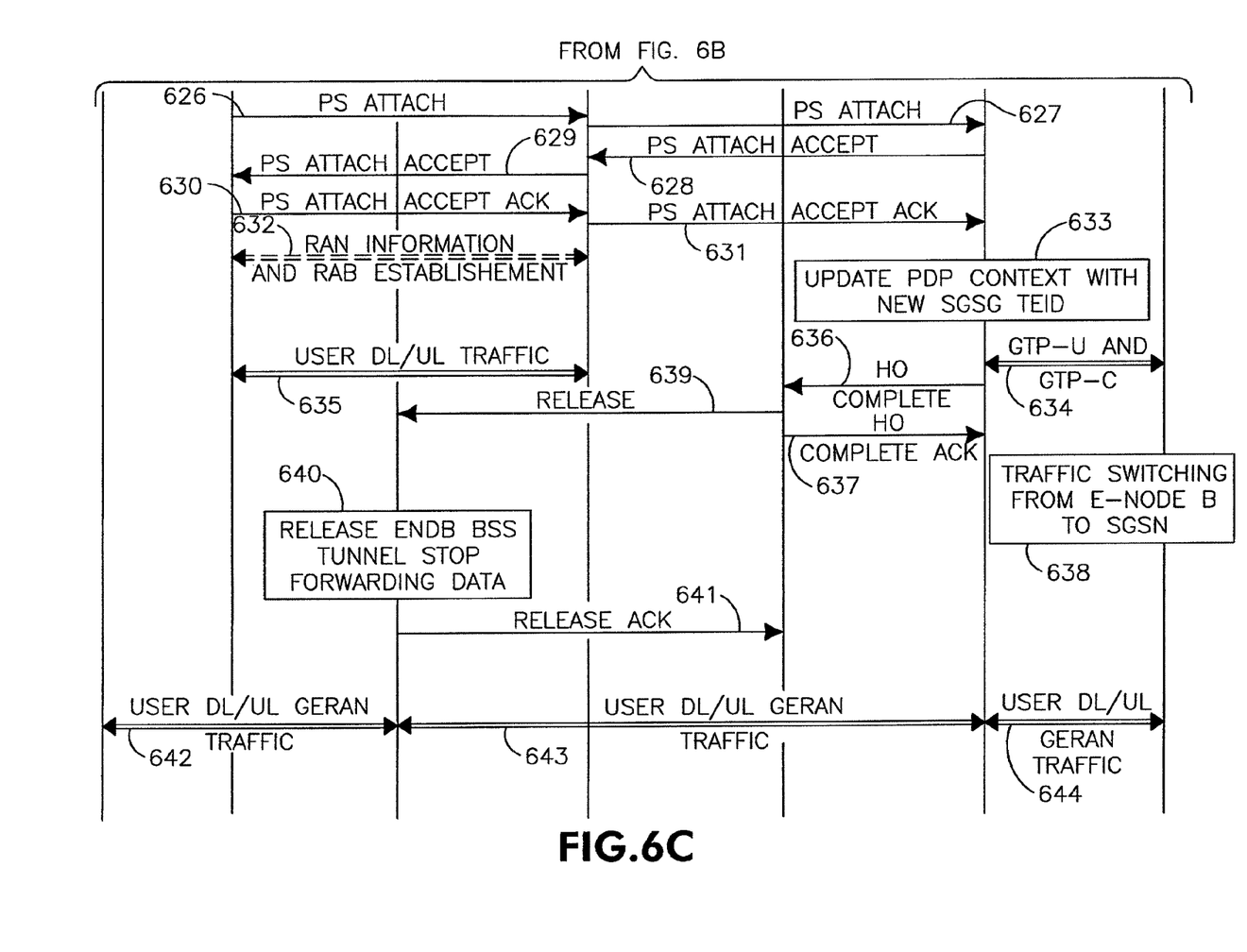

In a first embodiment, GERAN access procedures include packet switched (PS) attach signals between the LTE transceiver of the WTRU 510. FIGS. 6A-6C show an exemplary signal diagram of a handover procedure 600 for this embodiment. While the following signals are shown in FIGS. 6A-6C and described in a particular sequence, the signals may occur in variations to the sequence in accordance with this embodiment.

In the signal diagram of FIGS. 6A-6C, signals are exchanged among: a dual mode LTE/GERAN WTRU having an LTE transceiver and a GERAN transceiver, each transceiver comprising a receiver and a transmitter; a source e-Node B (S-ENB); a target BSC (T-BSC); a source LTE-MME; a target SGSN; and an LTE UPE/Gateway. The dual mode WTRU in this example includes an LTE and GERAN transceiver.

As shown in FIGS. 6A-6C, user downlink (DL) and uplink (UL) traffic 601a, 601b is exchanged between the WTRU LTE transceiver, the S-ENB and the LTE UPE/Gateway. The WTRU LTE transceiver performs measurements 605 on LTE frequencies and GERAN frequencies, and transmits a GERAN measurement report signal 606 to the S-ENB. The WTRU may receive a list of different radio access technologies, including GERAN, from the S-ENB to identify the types of frequency measurements to undertake. Intersystem Handover 607 is initiated by the S-ENB, which makes the handover decision based on the measurement report 606, with GERAN being the target. A relocation request signal 608, containing the source cell ID and the target cell ID, is transmitted from the S-ENB to the source MME. The source MME makes a determination 609 of the target system cell ID and the SGSN ID by mapping the target cell ID (GERAN) to an SGSN IP address. The source MME forwards the relocation request 610 to the target SGSN, including an international mobile subscriber identity (IMSI), source cell ID and target cell ID.

The target SGSN performs a determination 611 of the target BSC ID, and requests the user profile and context if it was not included in signaling message 610. The target SGSN sends a handover request signal 612 to the T-BSC, including the cell ID, SGSN ID, and the international mobile subscriber identity/temporary mobile subscriber identity (IMSI/TMSI). The T-BSC performs a determination 613 of channel availability and initiates radio access bearer (RAB) establishment. The T-BSC transmits a handoff request ACK 614, including the IMSI/TMSI, to the Target SGSN. A user plane and control plane tunnel 615 is established between the T-BSC and the Target SGSN. The target SGSN creates an MM state and SM state 616 to prepare for activating packet data protocol (PDP) context information.

The target SGSN sends a relocation response 617 including an IMSI and SGSN ID, to the Source MME, which sends a relocation command signal 618, that includes the TMSI and target BSC ID to the S-ENB. A temporary tunnel 619 to the T-BSC is established by the S-ENB to forward user data to the T-BSC. A handover command 620 is transmitted from the source MME to the S-ENB, and is forwarded to the WTRU LTE transceiver, which recognizes the target GERAN technology amongst others that may be supported, and an initiate/synch radio signal 621, including a target channel ID, is communicated to the WTRU GERAN transceiver. The GERAN transceiver sends an ACK signal 623. User data 622 is exchanged on the temporary tunnel 619 between the S-ENB and the T-BSC. A handover complete signal 624 is sent from the WTRU LTE transceiver to the S-ENB. The T-BSC sends a relocation detect signal 625 to the target SGSN.

The GERAN access procedure includes a PS attach signal 626 transmitted from the WTRU GERAN transceiver to the T-BSC, which forwards the PS attach signal 627 to the target SGSN. A PS attach accepted signal 628 is returned by the target SGSN to the T-BSC. The WTRU GERAN transceiver is configured to receive a PS attach Accept 629 from the T-BSC, and to respond with a PS attach accept ACK 630. The T-BSC forwards a PS attach accept ACK signal 631 to the target SGSN.

The target SGSN performs an update 633 of the PDP context with the new SGSN TEID, and establishes a tunnel 634 with the LTE UPE/gateway for a GPRS tunneling protocol user plane and control plane (GTP-U and GTP-C). At this stage the user plane path is established for all PDP contexts between the WTRU GERAN transceiver, Target BSC, Target SGSN, and serving gateway. The switch of traffic 638 is complete from the source ENB to the target SGSN. Between the WTRU GERAN transceiver and T-BSC, a tunnel 632 is established for exchange of RAN information and RAB establishment, and user DL/UL traffic 635 is exchanged.

A handover complete signal 636 is sent from the target SGSN to the source MME, which sends a release signal 639 to the S-ENB and an HO complete ACK 637 to the target SGSN. The S-ENB performs a release 640 of its resources related to the WTRU, and stops forwarding data. A release ACK 641 is transmitted from the S-ENB to the source MME, and user DL/UL GERAN traffic now flows on tunnel 642 between the WTRU GERAN transceiver and the target BSC, on tunnel 643 between the T-BSC and the target SGSN, and on tunnel 644 between the target SGSN and the GGSN gateway.

Figure 7A:
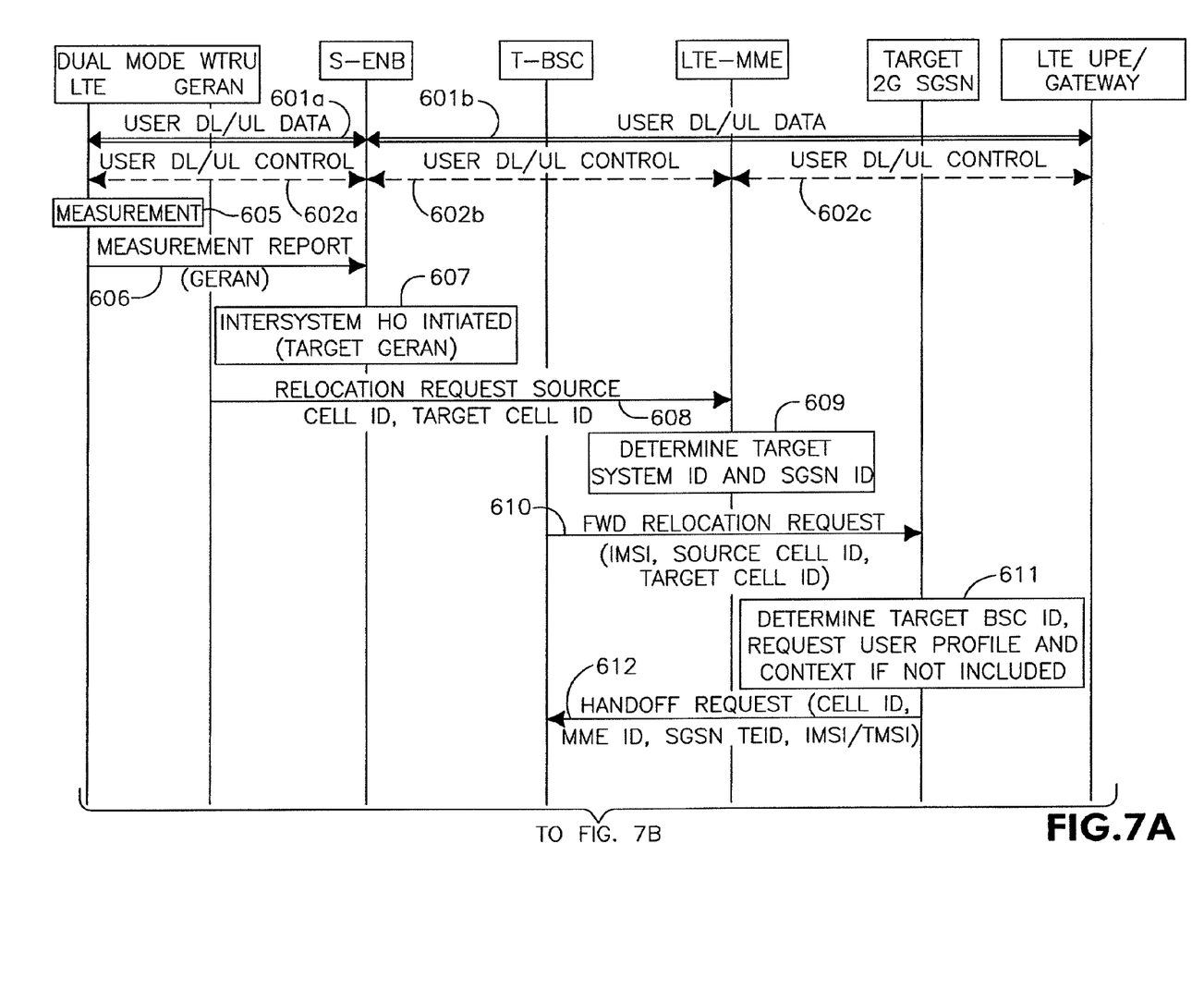
FIGS. 7A, 7B, 7C show a signal flow diagram of a handover procedure including a relocation detect from a source evolved Node-B (S-ENB) to a target base station controller (T-BSC).
Figure 7B:
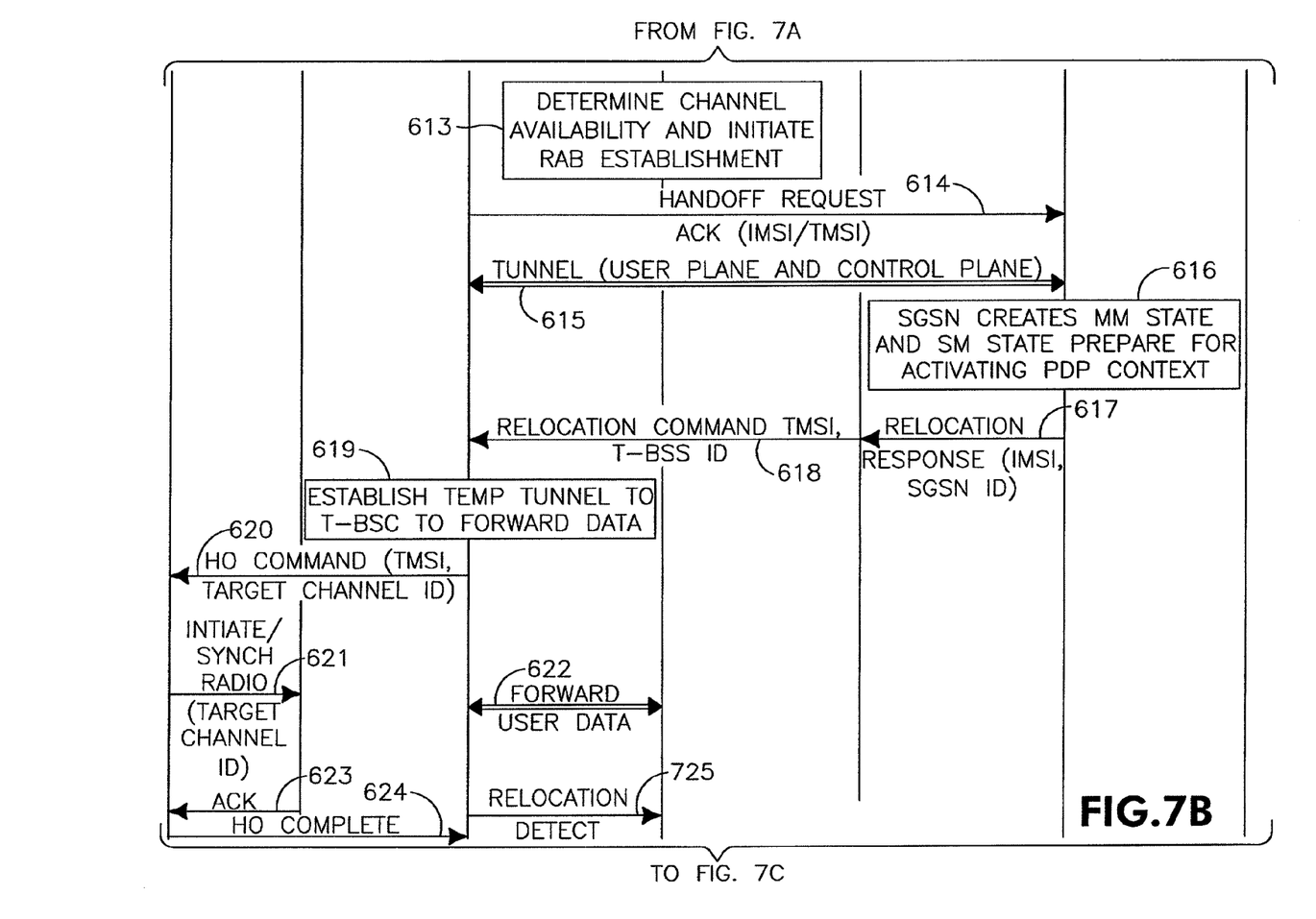
Figure 7C:
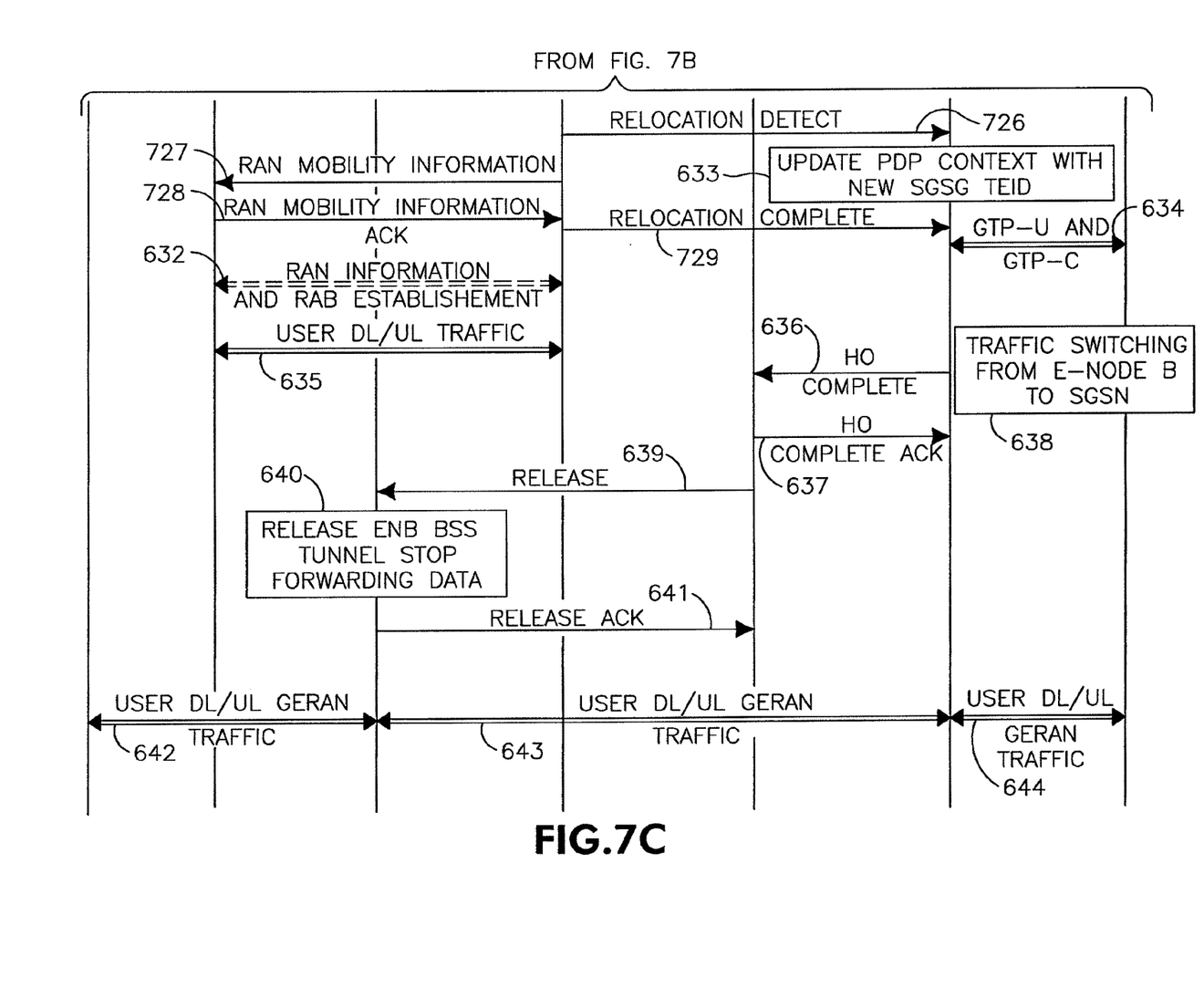

FIGS. 7A-7C show a signaling diagram according to a second embodiment in which the GERAN access procedure includes a relocation detect signal from the source ENB and the target BSC, and RAN mobility information signals. In this embodiment, the signals are similar to the first embodiment as shown in FIGS. 6A, 6B and 6C, except for the following signals which are used in lieu of the PS attach signals 626-631 excluded in this embodiment.

As shown in FIGS. 7A-7C, a GERAN access procedure begins the handover complete signal 624. A relocation detect signal 725 is sent by the S-ENB to the T-BSC, and a relocation detect signal 726 is forwarded from the T-BSC to the target SGSN. RAN mobility information 727 is transmitted by the T-BSC to the WTRU GERAN transceiver, which returns a RAN mobility information ACK 728. The T-BSC sends a Relocation complete signal 729 to the target SGSN.

As described in FIGS. 1-7C above, radio resources are prepared in the target 3GPP access system before the WTRU 510 is commanded by the source 3GPP access system to change to the target 3GPP access system. A tunnel is established between the two radio access networks (RANs) (basic service set (BSS)/basic service controller (BSC) and E-Node B) in order to forward the data while the core network resources are assigned.

A control interface may exist in the core level between the 2 G/3 G SGSN and corresponding MME to exchange the mobility context and the session context of the Mobile. Additionally, the target system may provide directions to the WTRU as to the radio access requirements, such as the radio resource configuration, target cell system information, and the like.

There is an intermediate state during handoff where the DL User plane data is sent from source system to the target system before the User plane is switched directly to the target system in order to avoid the loss of user data, (e.g., by forwarding). Bi-casting may also be used until the 3GPP Anchor determines that it can send DL U-plane data directly to the target system.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A source long term evolution (LTE) mobility management entity (MME) for supporting a handover of a wireless transmit/receive unit (WTRU) from an LTE/Evolved Universal Terrestrial Radio Access Network (EUTRAN) to a General Packet Radio Service (GPRS)/Global System for Mobile (GSM) Enhanced Data Rates for GSM evolution (EDGE) Radio Access Network (GERAN), the source LTE MME comprising:
   a processor, a memory configured to store instructions executed by the processor, a first interface, and a second interface,
   wherein the first interface is configured to receive a relocation request signal message including information indicating a target cell identification (ID) and a source cell ID for the handover of the WTRU,
   wherein the processor is configured to determine, in connection with the handover, an ID of a target GERAN system and an ID of a target serving General Packet Radio Service (GPRS) support node (SGSN) by mapping the target cell ID to an SGSN internet protocol (IP) address, wherein the target GERAN system comprises the target SGSN, and wherein the second interface is configured to:
(1) transmit a relocation request signal including an international mobile subscriber identity (IMSI), the source cell ID, and the target cell ID to the target SGSN,
(2) receive a relocation response signal including the IMSI and the target SGSN ID from the target SGSN, and
(3) transmit a relocation command signal including information indicating a temporary mobile subscriber identity (TMSI) and a target base station controller (BSC) ID to an evolved Node B (eNB).

2. The source LTE MME of claim 1, wherein the second interface is configured to receive a handover complete signal from the target SGSN, to transmit a handover complete acknowledgment signal to the target SGSN, to transmit a release signal to an evolved Node B (eNB), and to receive a release acknowledgment signal from the eNB.

3. The source LTE MME of claim 1, further comprising a receiver configured to: receive the relocation request message via the first interface.

4. The source LTE MME of claim 1, further comprising a transmitter and a receiver, wherein:
the transmitter is configured to transmit the relocation request signal to the SGSN via the second interface;
the receiver is configured to receive the relocation response signal from the target SGSN via the second interface; and
the transmitter is configured to transmit the relocation command signal to the eNB via the second interface.

5. The source LTE MME of claim 1, comprising a transmitter and a receiver, wherein:
the receiver is configured to receive the relocation request message via the first interface;
the transmitter is configured to transmit the relocation request signal to the SGSN via the second interface;
the receiver is configured to receive the relocation response signal from the target SGSN via the second interface; and
the transmitter is configured to transmit the relocation command signal to the eNB via the second interface.

6. A method for use in a source long term evolution (LTE) mobility management entity (MME) to support a handover of a wireless transmit/receive unit (WTRU), the method comprising:
receiving a relocation request signal including information indicating a target cell identification (ID) and a source cell ID for the handover of the WTRU from an evolved Node B (eNB);
determining, in connection with the handover, an ID of a target General Packet Radio Service (GPRS)/Global System for Mobile (GSM) Enhanced Data Rates for GSM evolution (EDGE) Radio Access Network (GERAN) system cell and an ID of a target serving General Packet Radio Service (GPRS) support node (SGSN) by mapping the target cell ID to an SGSN internet protocol (IP) address, wherein the target GERAN system comprises the target SGSN;
transmitting a relocation request signal including an international mobile subscriber identity (IMSP, the source cell ID, and the target cell ID to the target SGSN;
receiving a relocation response signal including the IMSI and the target SGSN ID from the target SGSN; and
transmitting a relocation command signal including information indicating a temporary mobile subscriber identity (TMSI) and a target base station controller (BSC) ID to the evolved Node B (eNB).

7. The method of claim 6, further comprising:
receiving a handover complete signal from the target SGSN;
transmitting a handover complete acknowledgment signal to the target SGSN;
transmitting a release signal to the eNB; and
receiving a release acknowledgment signal from the eNB.

* * * * *